Oct. 18, 1932.  F. J. PLYM  1,882,879

STORE FRONT CONSTRUCTION

Filed April 28, 1930

Inventor:
Francis J. Plym
By Wallace R. Lane
Atty.

Patented Oct. 18, 1932

1,882,879

UNITED STATES PATENT OFFICE

FRANCIS J. PLYM, OF NILES, MICHIGAN, ASSIGNOR TO THE KAWNEER COMPANY, OF NILES, MICHIGAN, A CORPORATION OF MICHIGAN

STORE FRONT CONSTRUCTION

Application filed April 28, 1930. Serial No. 447,859.

The present invention relates to store front constructions, and more in particular to a metallic sash construction adapted to facilitate the easy and ready setting of the pane of glass.

Among the objects of the invention is to provide a novel metal setting for plate glass or the like, in which the glass may be securely held between metal parts, one of which parts may be drawn into contacting engagement with the glass and to provide a constant tension against the plate of glass. This movable member is likewise sufficiently yieldable so as to provide a suitable contacting engagement which will firmly hold the glass, yet not enough to place the glass under strain, whereby making the same susceptible to splitting and cracking upon being subjected to vibrations and pressures from external sources, such as wind forces, or the application of force against the same, as where an individual may lean against the same.

Another object of the invention is to provide a novel metal setting for glass, the outer or moulding member of which is provided with a clip or clamping member, and which is engaged by means carried in the glass retaining member for drawing this moulding into contacting engagement with the glass.

A still further object of the invention is to provide a novel arrangement in which the clamping member slidably engages the outer or moulding member of the sash device and which is adapted to be adjusted longitudinally thereof for proper alignment with suitable means provided in the pane seating section for drawing this moulding into contacting engagement with the pane of glass.

In the illustrative embodiment, the invention comprehends the idea of providing a clip or clamping member having parts adapted to engage with the base and support of the pane seating member for additionally supporting the pane of glass in the pane seating section.

The invention further comprehends the idea of providing a novel arrangement whereby the means provided in the pane seating section for engaging with the clamping member for drawing the moulding into contacting engagement with the glass, is likewise provided with parts adapted to contact with those parts of the clamping member in contact with the pane seating section and base, for reinforcing the walls of the clamping member and providing further support for the glass.

Another object of the invention is to provide a novel construction of a clamp or clip member, which member, in the embodiment selected to illustrate the invention, is provided with a longitudinal opening for adjustment with a screw carried by the pane seating section, for drawing the moulding into contacting engagement with the glass, the end wall of this member being inclined to provide an opening having the lower edge forwardly of the upper edge to facilitate the easy and ready reception of this screw.

A still further object of the invention is to provide a novel constructed pane seating section in which portions of the glass support thereof are cut out and bent downwardly into contacting engagement with the base for supporting the glass support of this pane seating section at intervals therealong.

Other objects, features, capabilities and advantages are comprehended by the invention as will later appear, and as are inherently possessed thereby.

Referring to the drawing.

Figure 1:
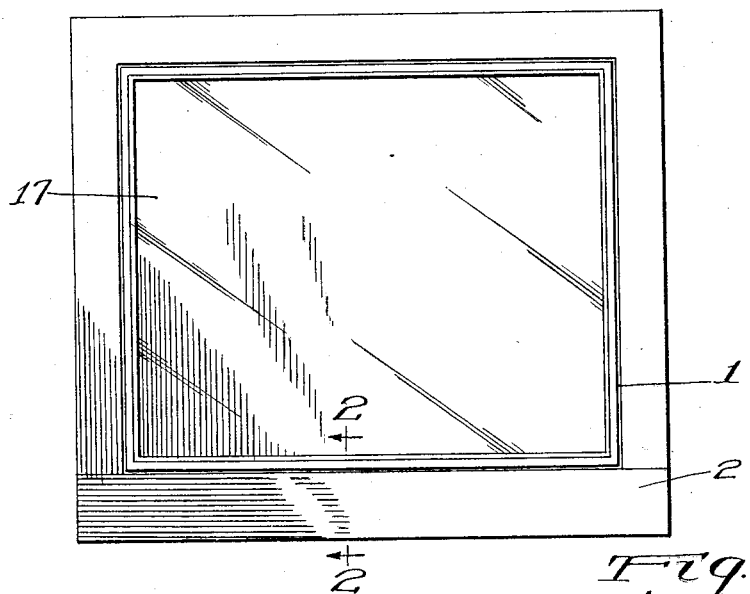
Fig. 1 is a view in front elevation of a window provided with the novel sash construction.
Figure 2:
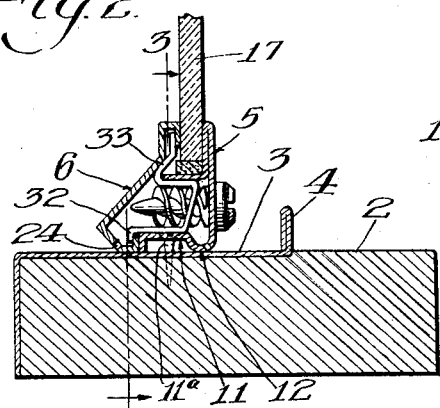
Fig. 2 is a view in vertical cross section taken in the plane represented by the line 2—2 of Fig. 1 of the drawing.

Referring now more in detail to the drawing, the embodiment selected to illustrate the invention is shown in a window construction 1 mounted upon a sill 2, upon which is mounted a metal sheathing 3, preferably of rust resisting material, and provided with an upwardly projecting flange 4 providing a gutter between the same and the sash construction.

The novel sash construction is shown as comprising an inner or pane seating section 5, an outer or moulding member 6, and a clip or clamping member 7. The inner or pane seating section is bent to form a backing member 8, the upper edge thereof being further bent upon itself to provide a glass abutting portion 9, the outer portion of which is horizontally bent outwardly to form the glass support 10, while the lower edge of this member is bent forwardly to provide a base 11. This base has a longitudinal inner rolled edge 12, and an outer flanged edge 13 for resting on the sheathing 3, while that portion between these edges is raised, as at 14, for a purpose to be hereinafter more fully disclosed.

This pane seating section may be secured by any suitable means, such as counter-sunk screws 11$^a$, or the like, at intervals to the sheathing 3 and sill 2 for maintaining the same in alignment, and to prevent its displacement, suitable holes 15 being provided in the rolled edge 12, if desired, for draining any water or moisture accumulating in the sash into the gutter between the sash and the upstanding part 4 thereof. Small blocks 16 of leather, or other suitable material are provided and spaced along the support 10 at intervals upon which rests the pane of glass 17, and which prevents chipping and breaking of the edge of the glass.

The outer or moulding member 6 is formed from an elongated metallic strip, the central part thereof being bent into any shape desired, preferably having a downwardly sloping part 18 for the proper run off of rain or moisture accumulating on the same, as likewise on the window pane. The upper edge of this strip is bent to form a U-shaped flange 19 providing a longitudinal groove 20, for a purpose to be hereinafter more fully explained, and to provide an inner flange 21 the inner face of which is adapted to engage and lay against the pane 17. The lower edge of this strip is bent to provide a bearing surface 22 adapted to rest upon the sheathing 3, and to provide an upstanding flange 23 adapted to contact and abut with the flange 13 of the base of the pane seating section 5. Openings 24 are provided at intervals along the lower edge of this member for draining moisture which may have collected within this outer member onto the sheathing 3.

The flanges of the outer or moulding member are engaged by the clamping member 7, which in turn is engaged by a screw 25 passing through an opening 26 in the pane seating section 5. Openings 26 are provided at intervals along the pane seating section, a clamping member being aligned therewith, and the screw carried therein for drawing the moulding into position and in contacting engagement with the glass 17. This clamping member 7 comprises a piece of sheet metal or the like which is bent to form a substantially U-shaped body portion 27 having an end wall 28, a lower wall 29, and an upper wall 30. The upper wall is further bent laterally to provide the upper flange 31, while the lower wall is laterally bent to provide the flange 32. The flanges 31 and 32 are adapted to slidably engage with the flanges 21 and 23 of the outer or moulding member, respectively, and may be slid longitudinally and relatively thereof for properly aligning the same with an opening 26 at a time when the sash construction is being assembled. In an assembled position, this clamping member 7 is adapted to be inserted between the support 10 and base 11 of the pane seating section 5, the upper wall 30 and lower wall 29 thereof contacting and frictionally engaging with the support 10 and raised part 14 of the base 11, while the lower part of the flange 31, as at 33 extends upwardly along the outer edge of the support 10, and contacts with the moulding, as at 34.

The end wall 28 of the clamping member is provided with an elongated slot 35, this wall being inclined upwardly and rearwardly to provide a slot having a lower edge 36 located forwardly of the upper edge 36$^a$ thereof, the inclination of this end wall being such that the upper and lower edges of the slot will intercept adjacent threads of the screw member 25.

The screw 25 is provided with helical threads 38 of equal diameter, and an end part or projecting point 39 for guiding the same into the slot 35 of the clamping member. When the sash is in an assembled position and the threads of the helical screws are in engagement with the clamping members, the threads thereof extending beyond the wall 28 contact with the inner faces of the walls 29 and 30 to provide additional support for the pane of glass 17, and to transmit a substantial amount of the weight thereof to the base 11, and into the sill 2.

Figure 3:
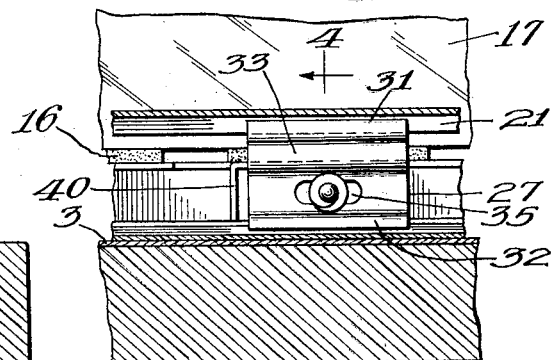
Fig. 3 is a fragmentary view in vertical cross section taken in a plane represented by line 3—3 of Fig. 2 of the drawing.
Figure 4:
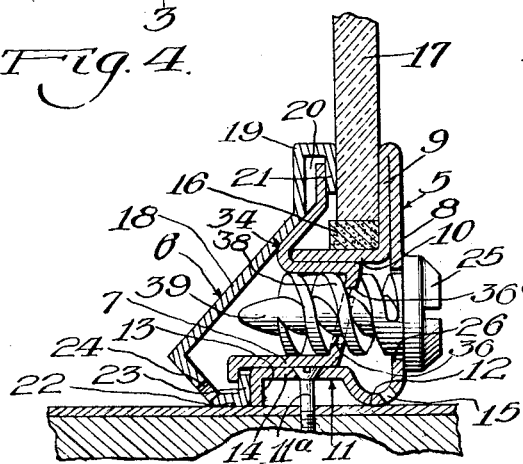
Fig. 4 is an enlarged cross sectional view similar to Fig. 2, and taken in a plane represented by line 2—2 of Fig. 1 of the drawing.
Figure 5:
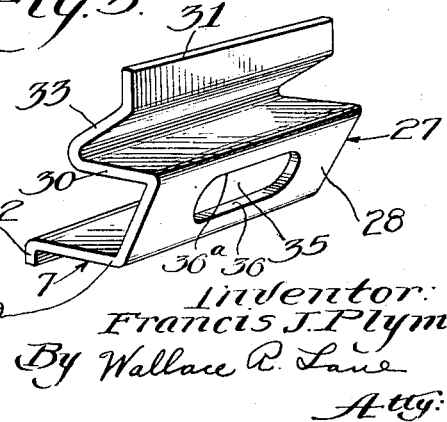
Fig. 5 is a view in perspective of the novel clip or clamping member.

In order to further provide supporting means for this pane of glass 17, the support 10, at intervals, is cut contiguous with the abutting portion 9 and laterally thereto, this cut portion being bent, as at 40, and as clearly shown in Fig. 3 of the drawing, to contact with the base 11, and to shore or reinforce the support 10.

In the assembly of the sash construction, the inner or pane seating section is placed in position and suitably attached by means of screws 11$^a$, or the like, to the sheathing 3 and sill 2. The glass is then placed in position upon the blocks 16, the moulding 6 in which the clamping members 7 have been previously placed, is then placed in position, the clamping members being aligned with the openings 26. This moulding is thrust into position, the clamping member contacting and being frictionally engaged by the support 10 and raised portion 14 of the base 11. The helical screws 25 are then inserted into the opening 26, the threads thereof engaging the slot 35 of the clamping member, and when driven home, will draw the clamping members together with the moulding inwardly, whereby the flange 21 will engage and hold the pane of glass 17, while the flange 23 is brought into abutting engagement with the flange 13. It will be seen that the present construction provides a simple and compact arrangement whereby glass may be easily and readily set, yet which will firmly secure the same in position, and which will hold the glass in such a manner that there is no tendency for the same to be chipped or cracked along the edge thereof.

While I have herein described and upon the drawing shown an illustrative embodiment of the invention, it is to be understood that the invention is not limited thereto, but may comprehend other constructions, arrangements of parts, details and features without departing from the spirit of the invention.

Having thus disclosed the invention,
I claim:

1. In a store front construction, the combination of a pane seating section, a moulding, a clamp member associated with said moulding and positioned within said pane seating section, and means engaging said section and member for drawing said member toward said section.

2. In a store front construction, the combination of a pane seating section, a moulding, said moulding provided with a flange, a clamp member positioned within said pane seating section and engaging said flange, and means engaging said section and member for drawing said moulding into contacting engagement with a pane of glass.

3. In a store front construction, the combination of a pane seating section, a moulding having a lower flanged edge adapted to contact with said section, said moulding provided with an upper flanged edge adapted to contact with a pane of glass, and a clamp member engaging said flanged edges of said moulding for drawing said edges into contact with said section and a pane of glass, respectively.

4. In a store front construction, the combination of a pane seating section bent to form a base and a support for a pane of glass, a moulding, and a clamp member between said base and support and engaging said moulding for drawing the same into contacting engagement with a pane of glass.

5. In a store front construction, the combination of a pane seating section bent to form a base and a support for a pane of glass, a moulding, and a clamp member frictionally engaging with said base and support and engaging said moulding for holding the same in contact with said pane of glass.

6. In a store front construction, the combination of a pane seating section bent to form a base and a support for a pane of glass, a moulding, and a clamp member engaging said moulding for drawing an edge thereof into engagement with said base and the other edge into contacting engagement with said pane of glass.

7. In a store front construction, the combination of a pane seating section bent to form a base and a support for a pane of glass, a moulding provided with flanges, and a clamp member frictionally engaging said base and support, said member having bent marginal portions for engaging said flanges.

8. In a store front construction, the combination of a pane seating section, a moulding, a clamp member carried in said section and engaging said moulding, and means in said section and engaging said member for drawing said moulding into contacting engagement with a pane of glass.

9. In a store front construction, the combination of a pane seating section bent to form a base and support for a pane of glass, a moulding, a clamping member engaging said base and support and said moulding, and means in said section and engaging said member for drawing said moulding into contacting engagement with a pane of glass.

10. In a store front construction, the combination of a pane seating section bent to form a base and support for a pane of glass, a moulding, a clamping member engaging said moulding and having parts engaging with said base and support, and means in said section for drawing said moulding into contacting engagement with a pane of glass, said means contacting said parts of the clamping member in engagement with said base and support.

11. In a store front construction, the combination of a pane seating section bent to form a base and support for a pane of glass, a moulding, a clamping member engaging said moulding having parts engaging with said base and support, and a screw member adapted to engage said member for drawing said moulding into contacting engagement with said pane of glass.

12. In a store front construction, the combination of a pane seating section bent to form a base and support for a pane of glass, a moulding, a clamping member engaging said moulding and having parts contacting with said base and support, and a screw member engaging said member and having threads contacting with said parts.

13. In a store front construction, a pane seating section bent to form a base, a support for a pane of glass, said support having a cut-out portion bent into contact with said base.

14. In a store front construction, a pane seating section bent to form a base, a backing member for bearing against a pane of glass, and a support for said glass, and means at intervals between said support and base for additionally supporting said glass.

15. In a store front construction, a clamping member bent to provide an end part and forwardly extending sides, and flanges extending laterally thereto, said end part having an elongated opening therein.

16. In a store front construction, a clamping member bent to provide a body portion having laterally extending flanges, the end wall of said body portion being inclined and provided with an opening therein.

17. In a store front construction, a clamping member bent to provide a body portion having laterally extending flanges, the end wall of said body portion being inclined, said inclined wall having an aperture therein, the lower edge of said aperture being forwardly of the upper edge thereof.

18. In a store front construction, a clamping member bent to provide a body portion having laterally extending flanges, the end wall of said body portion provided with an aperture, said wall being inclined so that the lower edge of said aperture is forwardly of the upper edge thereof whereby said edges will intercept adjacent threads of a screw member.

19. In a store front construction, a clamping member bent to provide a substantially U-shaped body portion having laterally extending flanges, the end wall of said body portion being inclined upwardly and provided with an elongated slot therein.

20. In a store front construction, the combination of a pane seating section bent to form a base and support for a pane of glass, a moulding, a substantially U-shaped clamping member between said base and support and having parts engaging said moulding, said member having an elongated slot, a screw member in said section and engaging in said slot, the lower edge of said slot being forwardly of the upper edge substantially equal to the space between adjacent threads of said screw.

21. In a store front construction, the combination of a pane seating section having a base and support for a pane of glass, a moulding, a clamping member engaging said moulding and seating in said section, and means in said section engaging said member for drawing said moulding into contacting engagement with said pane of glass.

22. In a store front construction, the combination of a pane seating section having a base and support for a pane of glass, a moulding, a clamping member engaging said moulding and supported on said base, and means in said section engaging said member for drawing said moulding into contacting engagement with said pane of glass.

23. In a store front construction, the combination of a pane seating section having a base and support for a pane of glass, a moulding, a clamping member engaging said moulding and having parts engaging said base and support, and means in said section engaging said member for drawing said moulding into contacting engagements with said pane of glass.

24. In a store front construction, the combination of a pane seating section provided with a support for a pane of glass, a moulding, a clamping member engaging said moulding and support, and a screw member adapted to engage said member for drawing said moulding into contacting engagement with a pane of glass.

In witness whereof, I hereunto subscribe my name to this specification.

FRANCIS J. PLYM.